Oct. 14, 1947.                I. J. GRUENBERG                2,428,968
                              OVER-RUNNING CLUTCH
                              Filed Dec. 10, 1945

INVENTOR.
IVOR J. GRUENBERG
BY
Whittemore Hulbert + Belknap
ATTORNEYS

Patented Oct. 14, 1947

2,428,968

UNITED STATES PATENT OFFICE 2,428,968

OVERRUNNING CLUTCH

Ivor J. Gruenberg, Pleasant Ridge, Mich., assignor to The Gear Grinding Machine Company, Hamtramck, Mich., a corporation of Michigan Application December 10, 1945, Serial No. 634,006

4 Claims. (Cl. 192—45.1)

The invention relates to over-running clutches of that type in which the drive and driven members have concentric cylindrical surfaces and sprags in the space therebetween for transmitting torque from one to the other in one direction of rotation.

It is the object of the invention to obtain a construction in which the sprags are normally held in released position so as to permit free relative rotation of the members without wear.

It is a further object to obtain a construction in which an instantaneous engagement of the clutch may be effected by a tripping action and when once engaged will be maintained in engagement while under load but will be automatically disengaged on release of load. With these and other objects in view the invention consists in the construction as hereinafter set forth.

A is a shaft. B is a member sleeved upon the shaft A and keyed or otherwise secured thereto to rotate therewith. C is an annular member surrounding the member B but spaced therefrom. D are sprags within the space between the members B and C and E is a resilient member also within the space surrounding the sprags D and normally providing clearance from the inner face of the member C. This member E is preferably a helical coil having the convolutions thereof of oblong cross section. The opposite ends E' and E² of this coil extend axially outward therefrom and the end E' engages a notch F' in a radial flange F on the member B. The resilient tension of the coil is sufficient to hold the sprags in frictional engagement with the member B while the coil itself is out of frictional engagement with the member C. If, however, an obstacle is placed in the path of the end E² of the coil so as to temporarily arrest its rotation, this will expand the coil until it comes into locking frictional engagement with the inner surface of the member C. Thus, normally the shaft A, sleeve B, sprags D and coil E will revolve together free from frictional engagement with the member C but at any time the clutch may be engaged by momentarily stopping the end E² of the coil. Such stopping may be effected by any suitable tripping mechanism, such as a lever G, normally clearing the path of the portion E² but adapted to be moved into such path by a trip rod G'. This will cause a substantially instantaneous expansion of the coil into frictional engagement with the member C, while the sprags D will form a driving engagement between the member B and said coil. Consequently, all of these parts will revolve together and will continue to so revolve after disengagement of the trip as long as the member C is under load. When, however, the load is released, the coil E will contract thereby releasing its frictional engagement with the member C. It will be understood that the member C can be connected in any suitable way with the load actuated thereby such, for instance, by a belt or gear connection and it is, therefore, unnecessary to illustrate any particular means for this purpose. The sprags may be energized by any suitable means but as shown, expansion garter springs H engage notches in the opposite ends of the sprags and exert sufficient torque on each sprag to hold it in frictional engagement with the member B and the coil E. The force exerted by these springs H is not, however, sufficient to overcome the contractile force exerted by the helical coil E.

Figure 1:
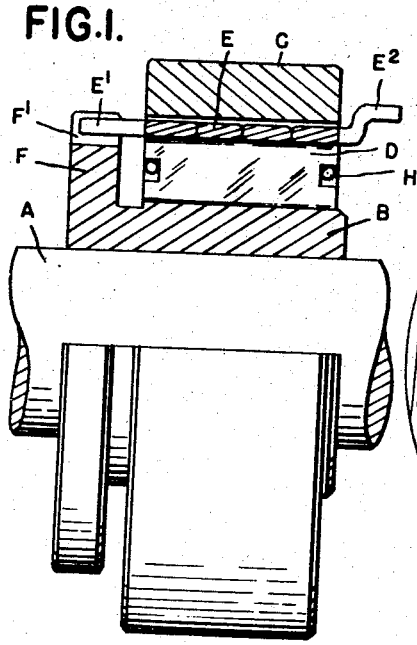
Fig. 1 is a longitudinal section partly in elevation of the clutch.
Figure 2:
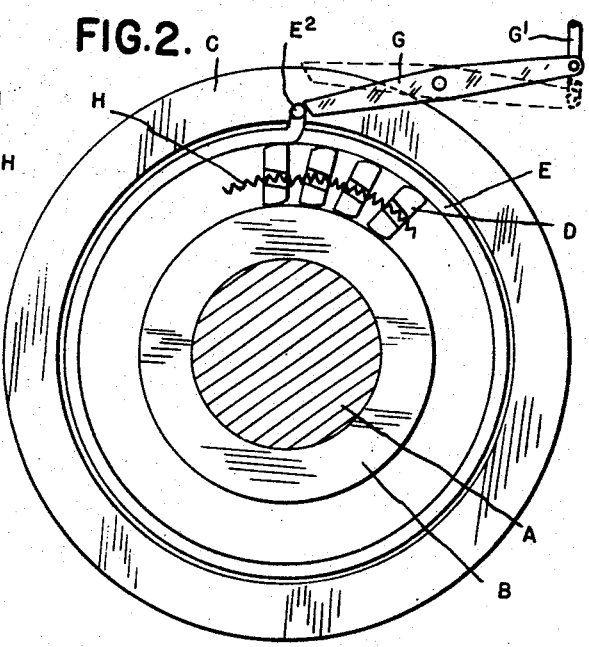
Fig. 2 is a side elevation thereof.
Figure 4:
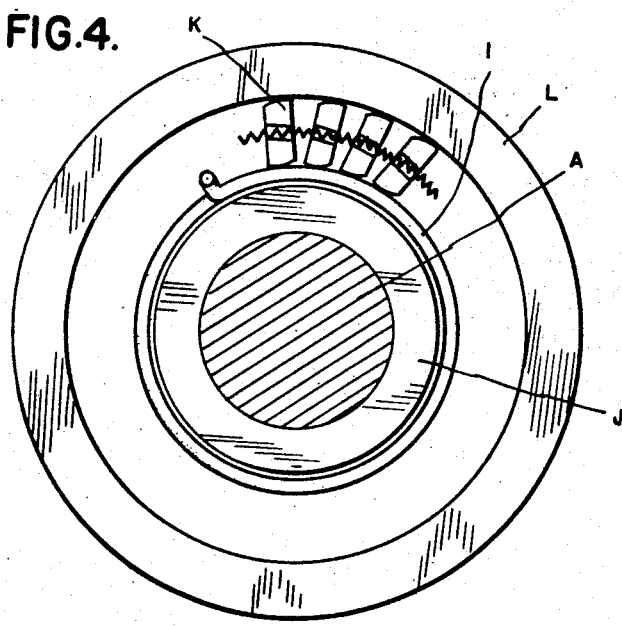
Fig. 4 is a view similar to Fig. 2 illustrating a modified construction.
Figure 3:
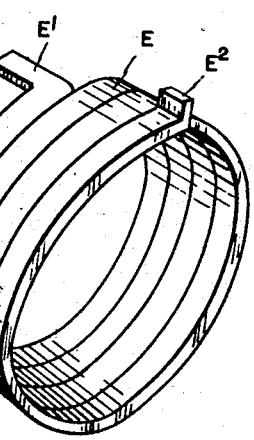
Fig. 3 is a perspective view of the helical member which holds the clutch normally disengaged.

In the modified construction shown in Fig. 4, a helical member I surrounds the inner race member J normally in close proximity thereto but out of frictional contact therewith. The sprags K are between the member I and the outer race member L. To engage the clutch the ends of the member I are relatively moved to contract the diameter of this member thereby frictionally engaging the race member J whereupon the sprags K couple the same to the outer race member.

What I claim as my invention is:

1. A clutch comprising coaxial relatively rotatable members having spaced cylindrical races, a resilient member having one or more convolutions arranged adjacent to one of said races but normally out of frictional contact therewith, sprags in the space between said resilient member and the other of said races, and means for relatively moving the opposite ends of said resilient member to change the diameter thereof, and bring said member into frictional contact with the adjacent race.

2. A clutch comprising coaxial relatively rotatable members having spaced cylindrical races, a resilient member formed in one or more convolutions with oppositely extending end portions, said resilient member being arranged in close proximity to but normally out of frictional contact with one of said races, a series of sprags between said resilient member and the other of said races, means for relatively moving said end portions circumferentially to change the diameter of said resilient member so as to frictionally engage the adjacent race, and means for automatically energizing said sprags to maintain the frictional engagement between the same and said resilient member.

3. A clutch comprising coaxial relatively rotatable members having spaced cylindrical races, a resilient member formed in one or more convolutions with axially projecting end portions, said resilient member being in close proximity to but normally out of frictional contact with one of said races, a series of sprags between said resilient member and the other of said races, an anchor connection between the latter race and one end portion of said resilient member, and means for circumferentially moving the other end of said resilient member relative to said anchored end to change the diameter of said resilient member to frictionally engage the same with the adjacent race.

4. A clutch comprising coaxial relatively rotatable members having spaced cylindrical races, one of said members being in rotation, a resilient member formed in one or more convolutions with axially projecting end portions, one of said end portions being anchored to said rotating member and said resilient member being positioned adjacent to the race of the other of said relatively rotatable members, and a trip for engaging the opposite end portion of said resilient member to move the same circumferentially relative to said anchored end portion thereby changing the diameter of said resilient member to frictionally engage the adjacent race and to effect a coupling between the same and the rotating member.

IVOR J. GRUENBERG.